United States Patent
Bryant (10) Patent No.: US 11,993,989 B2
(45) Date of Patent: May 28, 2024

(54) TUBULAR MANAGEMENT SYSTEM

(71) Applicant: Schlumberger Technology Corporation, Sugar Land, TX (US)

(72) Inventor: Aaron Bryant, Tomball, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/004,374

(22) PCT Filed: Jul. 7, 2021

(86) PCT No.: PCT/US2021/040754
§ 371 (c)(1),
(2) Date: Jan. 5, 2023

(87) PCT Pub. No.: WO2022/011057
PCT Pub. Date: Jan. 13, 2022

(65) Prior Publication Data
US 2023/0279731 A1    Sep. 7, 2023

Related U.S. Application Data (60) Provisional application No. 63/048,968, filed on Jul. 7, 2020.

(51) Int. Cl.
*E21B 19/14* (2006.01)
*E21B 19/16* (2006.01)
(Continued)

(52) U.S. Cl.
CPC ............ *E21B 19/165* (2013.01); *E21B 47/12* (2013.01); *G01B 11/043* (2013.01); *G01B 11/08* (2013.01)

(58) Field of Classification Search
CPC .......................................... E21B 19/14–19/20
See application file for complete search history.

(56) References Cited

U.S. PATENT DOCUMENTS 9,243,461 B1    1/2016  Barnes
10,837,243 B2  11/2020  Magnuson
(Continued)

FOREIGN PATENT DOCUMENTS

EP        0984132 A2      3/2000
WO    WO-2017132297 A2 *  8/2017 ........... E21B 17/006

OTHER PUBLICATIONS

Search Report of International Patent Application No. PCT/US2021/040754 dated Oct. 29, 2021; 3 pages.
(Continued)

*Primary Examiner* — Kipp C Wallace
(74) *Attorney, Agent, or Firm* — Jeffrey D. Frantz (57) ABSTRACT

A drilling system includes a horizontal tubular handling and transfer assembly configured to receive a tubular component, a first sensor array disposed at a first axial location on the horizontal tubular handling and transfer assembly, and a second sensor array disposed at a second axial location on the horizontal tubular handling and transfer assembly. The drilling system also includes processing circuitry configured to determine a length dimension of the tubular component based on first data feedback from the first sensor array, second data feedback from the second sensor array, or both. The processing circuitry is also configured to determine a diameter dimension of the tubular component based on the first data feedback, the second data feedback, or both.

20 Claims, 8 Drawing Sheets

(51) Int. Cl.
*E21B 47/12* (2012.01)
*G01B 11/04* (2006.01)
*G01B 11/08* (2006.01)

(56) References Cited

U.S. PATENT DOCUMENTS

| | | |
|---|---|---|
| 11,668,142 B2 | 6/2023 | Berry |
| 2013/0340998 A1 | 12/2013 | Flusche |
| 2015/0167410 A1 | 6/2015 | Garber |
| 2015/0240576 A1 | 8/2015 | Dore |
| 2015/0308201 A1 | 10/2015 | Breziat |
| 2016/0060980 A1 | 3/2016 | Magnuson |
| 2016/0356105 A1 | 12/2016 | Jonah |
| 2019/0136650 A1* | 5/2019 | Zheng .................... E21B 44/00 |
| 2019/0186216 A1 | 6/2019 | Magnuson |
| 2019/0385298 A1* | 12/2019 | Torrione ............... E21B 17/006 |
| 2020/0126386 A1* | 4/2020 | Michalopulos ........ G08B 21/02 |
| 2020/0394779 A1* | 12/2020 | Ayanambakkam ....... G06T 7/80 |
| 2021/0115742 A1* | 4/2021 | Agarwal ................. G01D 5/14 |

OTHER PUBLICATIONS

Written Opinion of International Patent Application No. PCT/US2021/040754 dated Oct. 29, 2021; 6 pages.

\* cited by examiner

TUBULAR MANAGEMENT SYSTEM

CROSS-REFERENCE SECTION

This application is the National Stage Entry of International Application No. PCT/US2021/040754, filed Jul. 7, 2021, which claims priority to and the benefit of U.S. Provisional Application No. 63/048,968, entitled "TUBULAR MANAGEMENT SYSTEM," filed Jul. 7, 2020, which is incorporated by reference herein.

TECHNICAL FIELD

The present disclosure relates to tubular handling systems and methods for measuring tubular dimensions in a drilling operation. In particular, the invention relates to systems and methods that measure tubular dimensions via interferometer arrays disposed on an assembly station and/or a catwalk machine of the drilling operation.

BACKGROUND ART

In the exploration of oil, gas, and geothermal energy, drilling operations are used to create boreholes, or wells, in the earth. Modern drilling rigs not only have drilling capability, but they also have pipe handling capability to allow simultaneous drilling and pipe handling operations.

Conventional drilling involves having a drill bit on the bottom of the well. A bottom-hole assembly is located immediately above the drill bit where directional sensors and communications equipment, batteries, mud motors, and stabilizing equipment are provided to help guide the drill bit to the desired subterranean target. A set of drill collars are located above the bottom-hole assembly to provide a non-collapsible source of weight to help the drill bit crush the formation. Heavy weight drill pipe is located above the drill collars for safety. The remainder of the drill string is mostly drill pipe, designed to be under tension. Each drill pipe is roughly 30 feet long, but lengths vary based on the style. It is common to store lengths of drill pipe in "doubles" (two connected lengths) or "triples" (three connected lengths) or even "quadruples" (four connected lengths). A "tubular stand" refers to connected sections of drill pipe, drill collars, casing, subs, or the like. Tubular components (including stands) may be hoisted to a drill floor for adding to the drill string during a first procedure of the drilling operation. Further, tubular components may be removed from the drill string during a second procedure, such as a tipping procedure, and removed from the drill floor for storage or other purposes.

Measurements may be taken of tubular components may be taken at various intervals of the drilling operation. In conventional drilling operations, these measurements may be taken and/or entered to a tubular tracking system manually. Procedures for manually determining tubular measurements and/or manually entering the tubular measurements to a tubular tracking system may be time consuming, costly, and susceptible to error. Additionally or alternatively, in conventional drilling operations, certain tubular measurements may be taken by devices that are expensive, relatively imprecise, and/or incapable of comprehensive measurement of certain tubular dimensions. These features of conventional drilling operations may lead to inaccurate determinations of drill string length, difficulties in constructing appropriately sized stands, and unnecessary contributions to operational costs. Accordingly, it is now recognized that improved tubular measurement systems and methods are desired.

SUMMARY OF INVENTION

In accordance with the teachings of the present disclosure, disadvantages and problems associated with existing drill rig control systems are alleviated.

According to one aspect of the invention, there is provided a drilling system that includes a horizontal tubular handling and transfer assembly configured to receive a tubular component, a first sensor array disposed at a first axial location on the horizontal tubular handling and transfer assembly, and a second sensor array disposed at a second axial location on the horizontal tubular handling and transfer assembly. The drilling system also includes processing circuitry configured to determine a length dimension of the tubular component based on first data feedback from the first sensor array, second data feedback from the second sensor array, or both. The processing circuitry is also configured to determine a diameter dimension of the tubular component based on the first data feedback, the second data feedback, or both.

According to another aspect of the invention, there is provided a method of measuring a tubular component for a drilling operation. The method includes passing the tubular component through a horizontal tubular handling and transfer assembly at a velocity. The method also includes detecting the tubular component via a first sensor array disposed at a first axial position of the horizontal tubular handling and transfer assembly, and detecting the tubular component via a second sensor array disposed at a second axial position of the horizontal tubular handling and transfer assembly. The method also includes determining, via processing circuitry, a length dimension of the tubular component based on an input indicative of the velocity and based on first data feedback received from the first sensor array, second data feedback received from the second sensor array, or both. The method also includes determining, via the processing circuitry, a diameter dimension of the tubular component based on the first data feedback, the second data feedback, or both.

According to still another aspect of the invention, there is provided a non-transitory, computer readable medium having instructions thereon that, when executed by one or more processors, cause the one or more processors to perform various functions. The functions include receiving first data feedback from a first sensor array disposed at a first location of a horizontal tubular handling and transfer assembly, receiving second data feedback from a second sensor array disposed at a second location of the horizontal tubular handling and transfer assembly, and receiving velocity data indicative of a velocity at which a tubular component is passed through the horizontal tubular handling and transfer assembly between the first location and the second location. The functions also include determining, based on the velocity data and based on the first data feedback, the second data feedback, or both, a length dimension of the tubular component. The functions also include determining, based on the first data feedback, the second data feedback, or both, a diameter dimension of the tubular component.

BRIEF DESCRIPTION OF DRAWINGS

A more complete understanding of the present embodiments may be acquired by referring to the following description taken in conjunction with the accompanying drawings, in which like reference numbers indicate like features.

The objects and features of the invention will become more readily understood from the following detailed description and appended claims when read in conjunction with the accompanying drawings in which like numerals represent like elements.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DESCRIPTION OF EMBODIMENTS

Preferred embodiments are best understood by reference to FIGS. 1-12 below in view of the following general discussion. The present disclosure may be more easily understood in the context of a high level description of certain embodiments.

According to various aspects of the present invention, a tubular management system for a drilling operation may include a horizontal tubular handling and transfer assembly configured to determine various dimensions of a tubular component (e.g., a drill pipe, a drill collar, a drill casing and/or lining, a drill sub, or a stand having any combination thereof). For example, the horizontal tubular handling and transfer assembly may include an assembly station, a catwalk machine, various sensor arrays disposed on the assembly station and the catwalk machine, and a controller having a processor and memory storing instructions thereon that, when executed by the processor, causes the processor to perform various functions. The assembly station may include multiple sensor arrays disposed at various axial locations along a trough of the assembly station. Likewise, the catwalk machine may include multiple sensor arrays disposed at various axial locations along a trough of the catwalk machine. The controller may be communicatively coupled to the various sensor arrays corresponding to the assembly station and the catwalk machine such that the controller receives data feedback from the various sensor arrays. The controller may determine various dimensions of one or more tubular components passed through the assembly station and the catwalk machine based on data feedback received from one or more of the various sensor arrays. In particular, the controller may determine various length dimensions of the tubular components and various diameter dimensions of the tubular components. In certain embodiments, a velocity at which the tubular component is passed through the assembly station, for example, may also be used by the controller to determine one or more of the length dimensions of the tubular component.

It should be noted that the horizontal tubular handling and transfer assembly may be configured to determine various dimensions of a number of different tubular components used in a drilling operation, including a drill pipe, a drill collar, a drill casing and/or lining, a drill sub, or a stand having any combination of the aforementioned components. Further, the horizontal tubular handling and transfer assembly may be configured to determine a number of different tubular dimensions, including a tube section diameter of the tubular component, a tool joint diameter of the tubular component, a collar diameter of the tubular component, a sub diameter of the tubular component, a shoulder-to-shoulder length of the tubular component, a box length of the tubular component, a thread length of the tubular component, a pin length of the tubular component, and/or a coupling length of the tubular component. Further, in some embodiments, a particular dimension of the tubular component may be determined by the controller as the tubular component is handled by the assembly station of the horizontal tubular handling and transfer assembly, and the same dimension of the tubular component may then be verified by the controller as the tubular component is handled by the catwalk machine of the horizontal tubular handling and transfer assembly. The above-described features, described in detail below with reference to the drawings, may enable improved accuracy and precision of measuring tubular component dimensions, which may lead to improved strand or drill string construction, improved strand or drill string deconstruction, reduced costs of the drilling operation, and other technical benefits relative to conventional embodiments.

Figure 1:
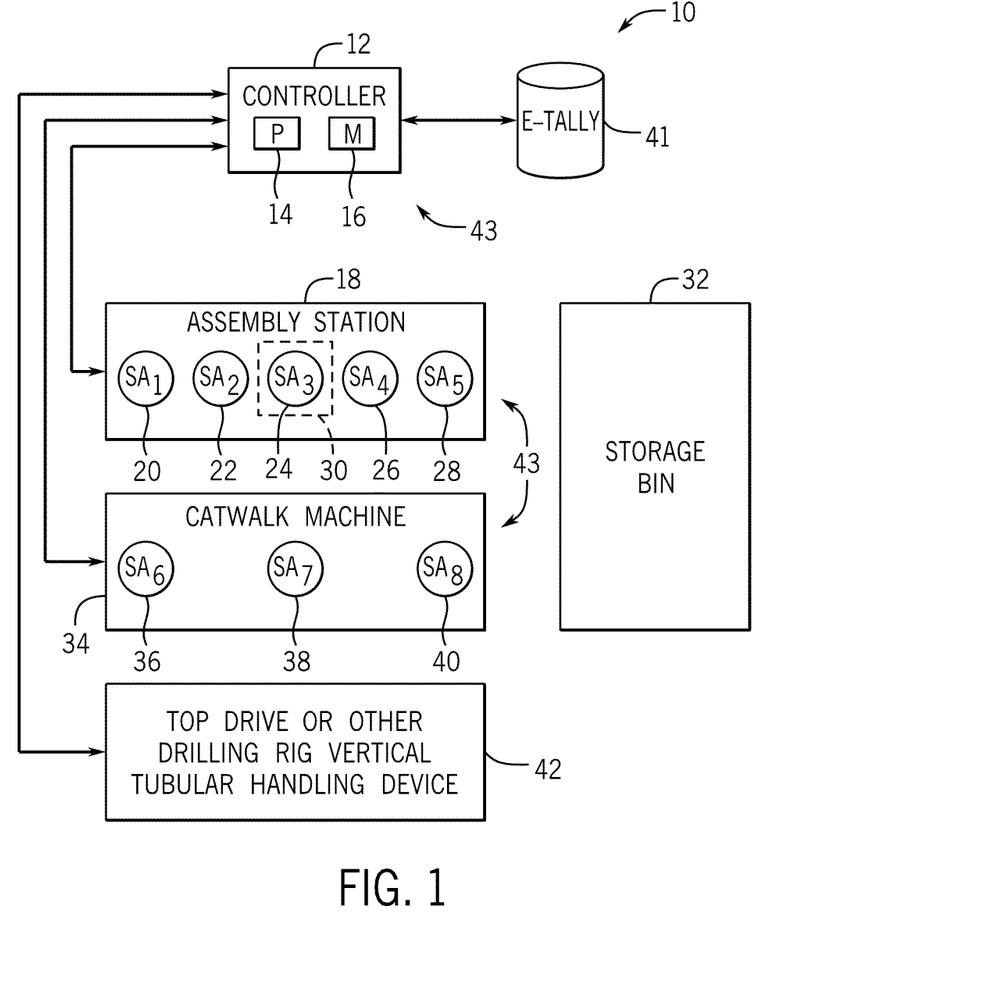
FIG. 1 is a schematic illustration of a tubular management system configured to determine dimensions of tubular components for a drilling operation, in accordance with an embodiment of the present disclosure.

FIG. 1 is a schematic illustration of an embodiment of a tubular management system 10 configured to determine dimensions of tubular components for a drilling operation. In the illustrated embodiment, the tubular management system 10 includes a controller 12 having a processor 14 (or processing circuitry and a memory 16 (or memory circuitry) storing instructions thereon that, when executed by the processor 14, cause the controller 12 (or processor 14 thereof) to perform various functions. It should be noted that the controller 12 having the processor 14 and the memory 16 is shown as a single integrated unit for purposes of simplicity. However, embodiments of the present disclosure may include multiple iterations of the controller 12, multiple iterations of the processor 14 or processing circuitry, and/or multiple iterations of the memory 16 or memory circuitry.

The tubular management system 10 also includes an assembly station 18 having a first sensor array 20, a second sensor array 22, a third sensor array 24, a fourth sensor array 26, and a fifth sensor array 28. In the illustrated embodiment, the first sensor array 20, the second sensor array 22, the fourth sensor array 26, and the fifth sensor array 28 may include close sensing interferometer assemblies, although other types of sensor arrays are also possible (e.g., fiber-optic sensor, proximity sensor, laser sensor, displacement sensor, etc.). Interferometer sensor arrays, as generally understood by one of ordinary skill in the art, work to merge two or more sources of light to create an interference pattern, which can be measured and analyzed to infer one or more dimensions of a tubular component in accordance with the present disclosure. Interferometer sensor arrays may be desirable based upon their accuracy and precision in measuring physical characteristics, such as dimensions of a tubular component, relative to other types of sensor arrays.

The third sensor array 24 may include a dual long sensing sensor array (e.g., dual long sensing interferometer sensor array) configured to facilitate alignment of tubular components at a bucking unit 30 of the assembly station. The bucking unit 30 may be configured to engage tubular components and/or disengage tubular components. The third sensor array 24 at the bucking unit 30 may be utilized to facilitate said engagement and/or disengagement of tubular components, while the first sensor array 20, the second sensor array 22, the fourth sensor array 26, and the fifth sensor array 28 may be utilized to facilitate determination of dimensions of the various tubular components passed through the assembly station 18. The controller 12 may be communicatively coupled to the assembly station 18 (e.g., to each sensor array 20, 22, 24, 26, 28) and configured to receive data feedback from the sensor arrays 20, 22, 24, 26, 28. In this way, the controller 12 may utilize the data feedback from the first sensor array 20, the second sensor array 22, the fourth sensor array 26, and the fifth sensor array 28 to determine various dimension of tubular components. Further, the controller 12 may utilize the data feedback from the third sensor array 24 at the bucking unit 30 to control the assembly station 18 (e.g., the bucking unit 30, hydraulics of the assembly station 18, pneumatics of the assembly station 18, a conveyer of the assembly station 18, other mechanics of the assembly station 18, or some other aspect of the assembly station 18 configured to move tubular components through the assembly station 18) to facilitate engagement or disengagement of tubular components.

The tubular management system 10 may also include a storage bin 32 and a catwalk machine 34. The storage bin 32 may be utilized to store tubular components at any point during a drilling operation. For example, tubular components passed through the assembly station 18 may be loaded in the storage bin 32 prior to being moved to the catwalk machine 34 (e.g., prior to delivery of the tubular components by the catwalk machine 34 to a drill floor of a drilling rig). Additionally or alternatively, tubular components passed through the catwalk machine 34 (e.g., after being removed from the drill floor of the drilling rig) may be stored in the storage bin 32 prior to delivery to the assembly station 18 (e.g., for disengaging the tubular components).

The catwalk machine 34 may include a fourth sensor array 36, a fifth sensor array 38, and a sixth sensor array 40. The sensor arrays 36, 38, 40 may be interferometer sensor arrays, similar to the assemblies 20, 22, 24, 26, 28 associated with the assembly station 18. The sensor arrays 36, 38, 40 at the catwalk machine 34 may also be communicatively coupled with the controller 12, such that the controller 12 receives data feedback from the sensor arrays 36, 38, 40 and analyzes the data feedback to determine or infer various dimensions of tubular components detected by the sensor arrays 36, 38, 40. In some embodiments, the data feedback received by the controller 12 from the sensor arrays 36, 38, 40 associated with the catwalk machine 34 may be analyzed by the controller 12 to verify dimensions of the tubular components (e.g., dimensions determined by the controller 12 via data feedback received from the sensor arrays 20, 22, 24, 26, 28 associated with the assembly station 18).

The controller 12 may also be communicatively coupled with an e-tally system having an e-tally database 41. Dimension of the various tubular components handled by the tubular management system 10 may be stored to the e-tally database 41. The data stored to the e-tally database 41 may be used at any point during a drilling operation to appropriately handle the tubular components. For example, a top drive 42 (or other drilling rig vertical tubular handling device) may be controlled by the controller 12 based at least in part on data indicative of dimensions of the tubular components and stored to the e-tally database 41. As will be appreciated in view of other drawings and the description thereof below, the illustrated tubular management system 10 may be configured to detect dimensions of a number of tubular components, including a drill pipe, a drill collar, a drill casing and/or lining, and a drill sub. Further, a number of dimensions may be determined, including a tube section diameter, a tool joint diameter, a collar diameter, a coupling diameter, a sub diameter, a shoulder-to-shoulder length, a box length, a pin length, a thread length, or a coupling length of the tubular component (e.g., drill pipe, drill collar, drill casing/lining, drill sub). It should be noted that the tubular management system 10 includes a horizontal tubular handling and transfer assembly 43 that includes at least the controller 12, the assembly station 18, and the catwalk machine 34. Indeed, while the catwalk machine 34 may handle tubular components in both a horizontal orientation and a vertical (or slanted) orientation, the catwalk machine 34 may be considered a part of the horizontal tubular handling and transfer assembly 43.

Figure 2:
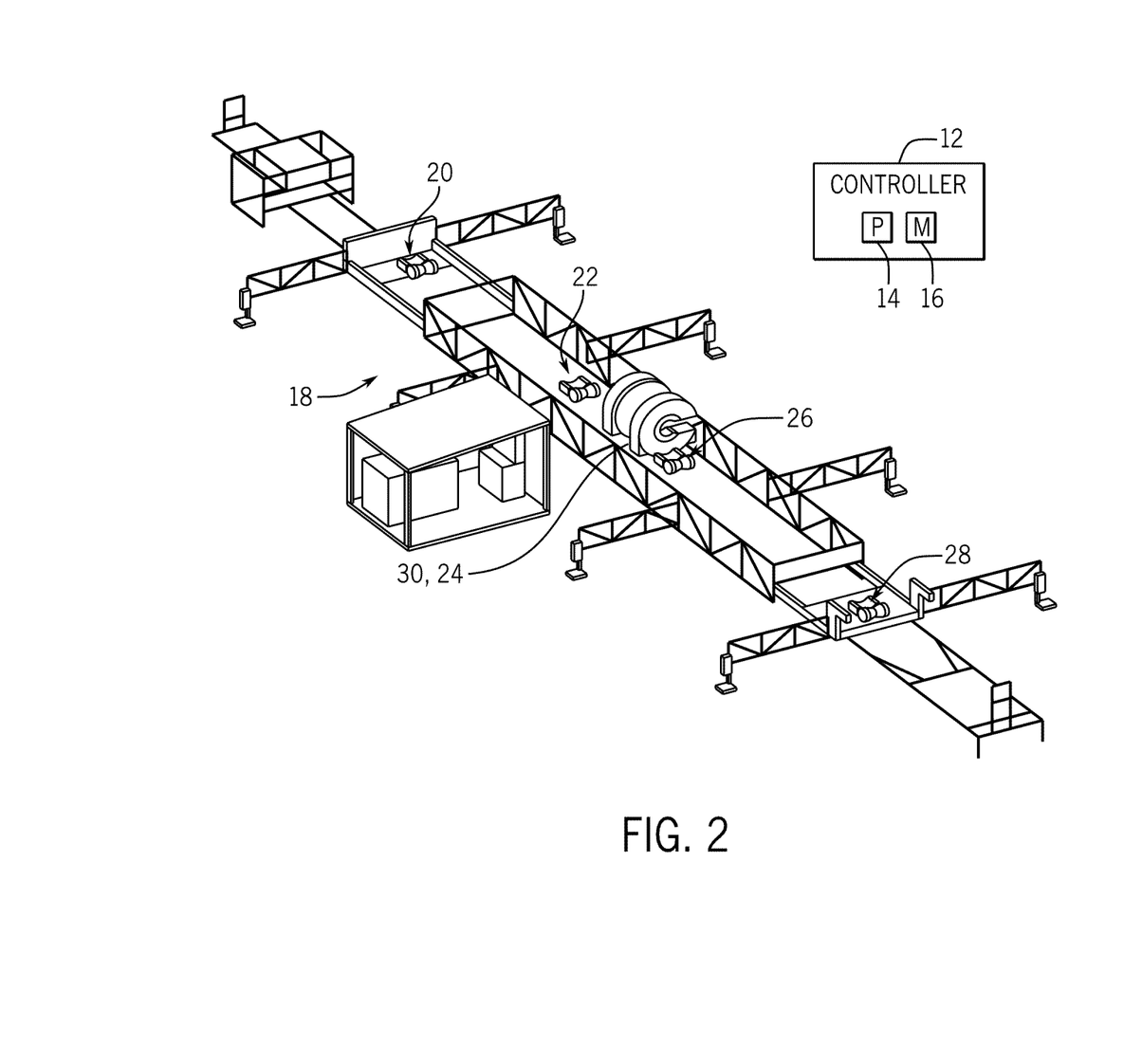
FIG. 2 is a perspective view of an assembly station of the tubular management system of FIG. 1, in accordance with an embodiment of the present disclosure.

One way to control FIG. 2 is a perspective view of an embodiment of the assembly station 18 of the tubular management system 10 of FIG. 1. In general, the assembly station 18 is configured to load tubular components, feed them toward the bucking unit 30, and/or transfer the tubular components (including stands) to the storage bin 32 of FIG. 1, the catwalk machine 34 of FIG. 1, or some other location. As previously described, the assembly station 18 may include the first sensor array 20, the second sensor array 22, the third sensor array 24 (e.g., disposed at the bucking unit 30 included on the assembly station 18), the sensor array 26, and the fifth sensor array 28. The first sensor array 20, the second sensor array 22, the fourth sensor array 26, and the fifth sensor array 28 may be close sensing sensor arrays (e.g., close sensing interferometer assemblies) used to determine length and diameter dimensions of tubular components loaded on the assembly station 18. The third sensor array 24 may be a long sensing sensor array (e.g., a dual long sensing interferometer assembly) used to control the bucking unit 30 and/or other features utilized to engage or disengage tubular components at the assembly station 18.

Figure 3:
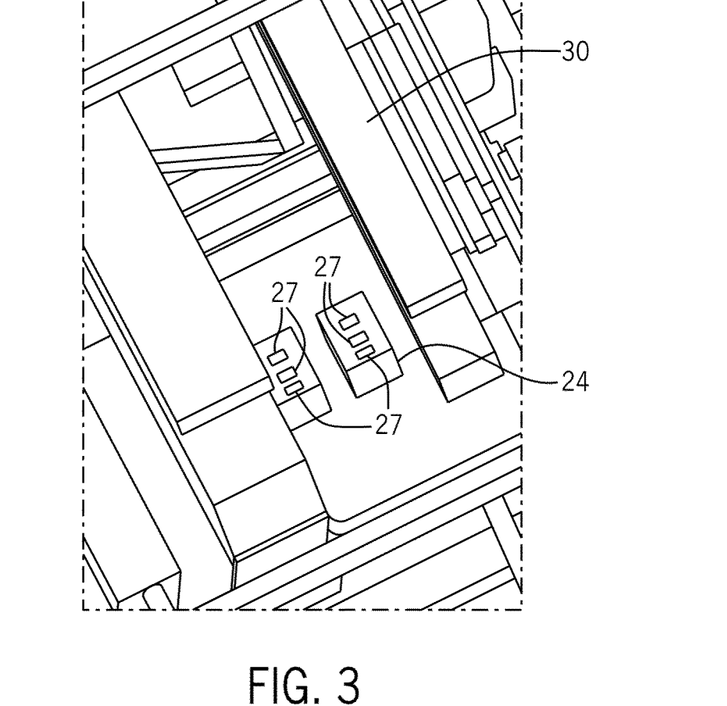
FIG. 3 is a close-up view of a bucking unit and a dual long sensing array positioned at the bucking unit of the assembly station of FIG. 2, in accordance with an embodiment of the present disclosure.
Figure 4:
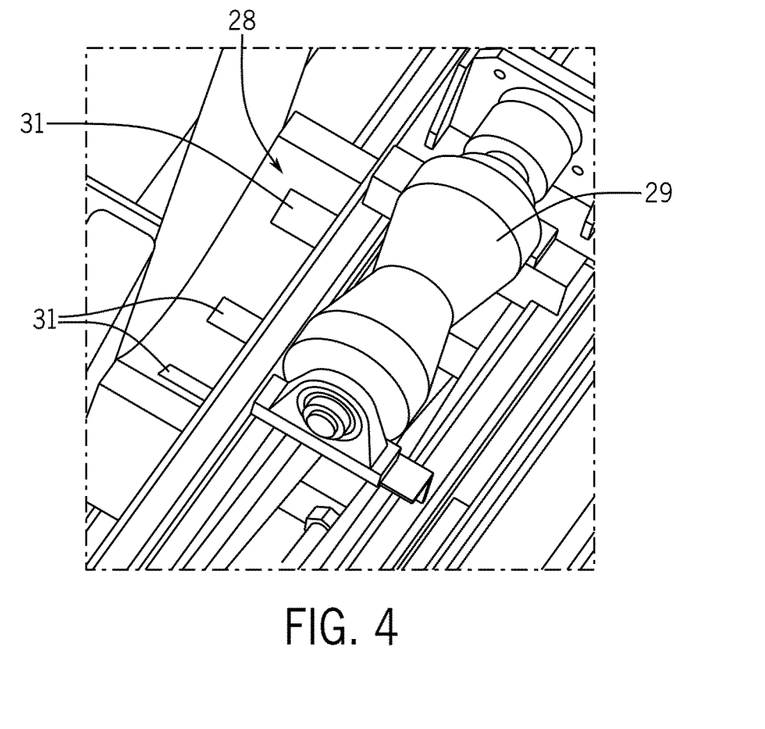
FIG. 4 is a close-up view of a close sensing sensor array positioned at an axial location of the assembly station of FIG. 2, in accordance with an embodiment of the present disclosure.

The controller 12 may be configured to receive data feedback from each of the sensor arrays 20, 22, 24, 26, 28. As noted above, the controller 12 may utilize the data feedback from the third sensor array 24 (e.g., the dual long sensing interferometer assembly) to control the bucking unit 30 and/or other features of the assembly station 18 to engage or disengage tubular components. The controller 12 may utilize the data feedback from the other sensor arrays 20, 22, 26, 28 (e.g., the close sensing interferometer assemblies) to determine length and diameter dimensions of the tubular components loaded to the assembly station 18. For purposes of clarity, FIG. 3 illustrates a close-up view of an embodiment of the bucking unit 30 and the third sensor array 24 (e.g., the dual long sensing array) positioned at the bucking unit 30 of the assembly station 18 of FIG. 2. As shown, the dual long sensing array may include a number of sensors or sensor components 27 (e.g., interferometer sensing components) utilized to detect various aspects of tubular components. Also for purposes of clarity, FIG. 4 is a close-up view of an embodiment of the fifth sensor array 28 (e.g., one of the close sensing interferometer arrays). As shown, the sensor array 28 may include an arcuate shape corresponding to arcuate shapes of tubular components passing through the assembly station 18. Further, the sensor array 28 may include a number of sensors or sensor components 31 (e.g., interferometer sensing components) utilized to detect various aspects of tubular components. FIG. 4 also depicts a roller 29 along which tubular components travel through the assembly station 18. A number of iterations of the roller 29 may be employed on the assembly station 18 to facilitate movement of the tubular components therethrough.

Figure 5:
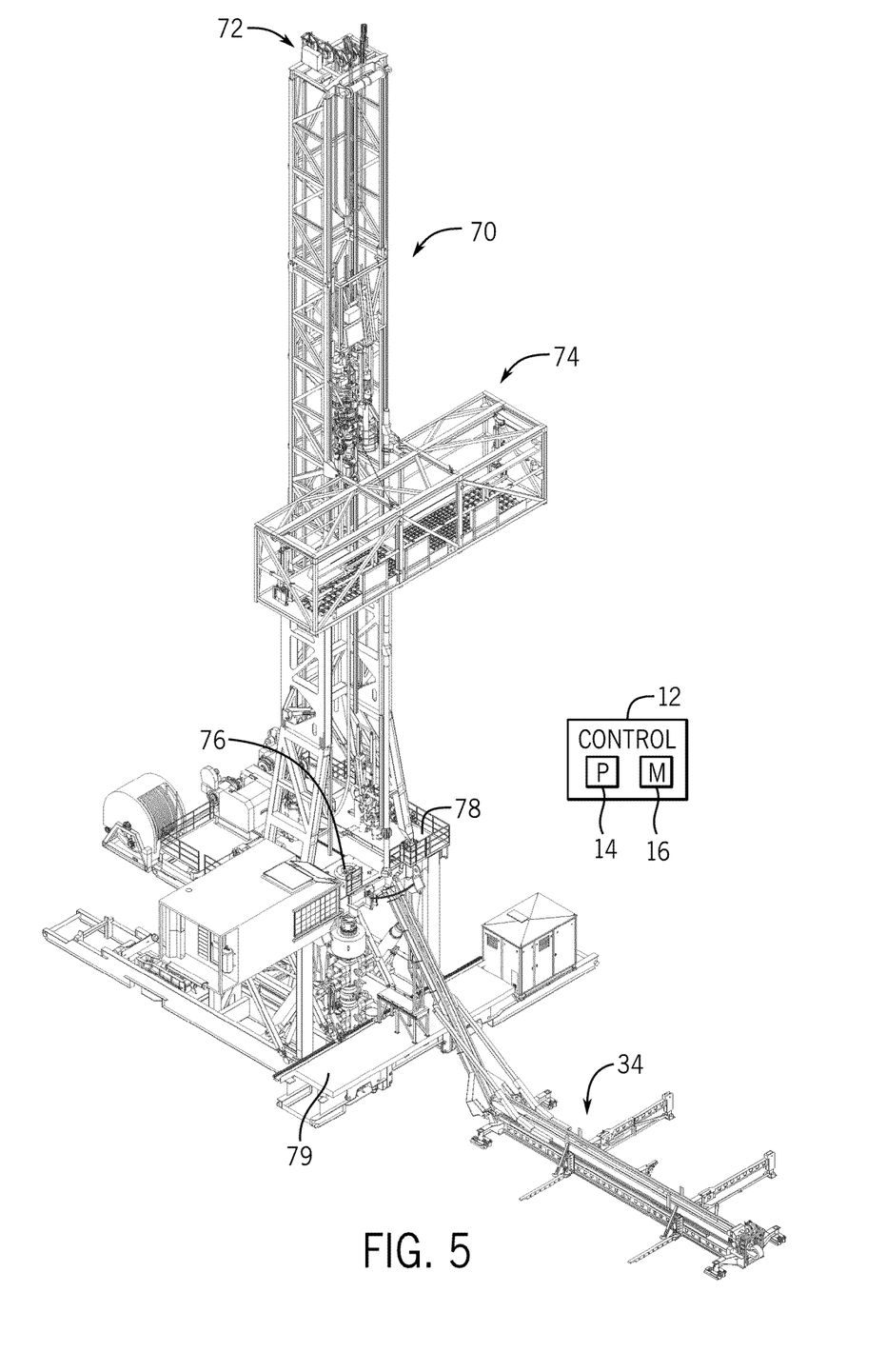
FIG. 5 is a perspective view of a drilling rig including a catwalk machine of the tubular management system of FIG. 1, in accordance with an embodiment of the present disclosure.

FIG. 5 is a perspective view of an embodiment of a drilling rig 70 including the catwalk machine 34 of the tubular management system 10 of FIG. 1. In the illustrated embodiment, the drilling rig 70 also includes a top drive 72, a racking module 74, and a well center 76 formed in or adjacent to a drill floor 78, among a plethora of other features. The top drive 72 may be used to provide clockwise torque to the drill string to drill a borehole (e.g., via the well center 76), and counterclockwise torque to remove the drill string or portions thereof from the borehole (e.g., via the well center 76). The racking module 74 may handle tubular components (e.g., stands) that rest on the setback platform 79 of the drilling rig 70. In general, the racking module 74 (in addition to a transfer racker, such as a transfer bridge racker, and/or other aspects of the drilling rig 70) may be used to transfer tubular components to and from the top drive 72. The racking module 74 is one non-limiting example of a drilling rig vertical tubular handling device 42 included in FIG. 1, along with the top drive 72, controllable by the controller 12 or a separate controller or controllers (e.g., a dedicated controller for the top drive 72). FIG. 5 is included in the present disclosure to provide context regarding a location of the catwalk machine 34 relative to other aspects of the drilling rig 70. The catwalk machine 34 is described in detail below with reference to FIG. 6.

Figure 6:
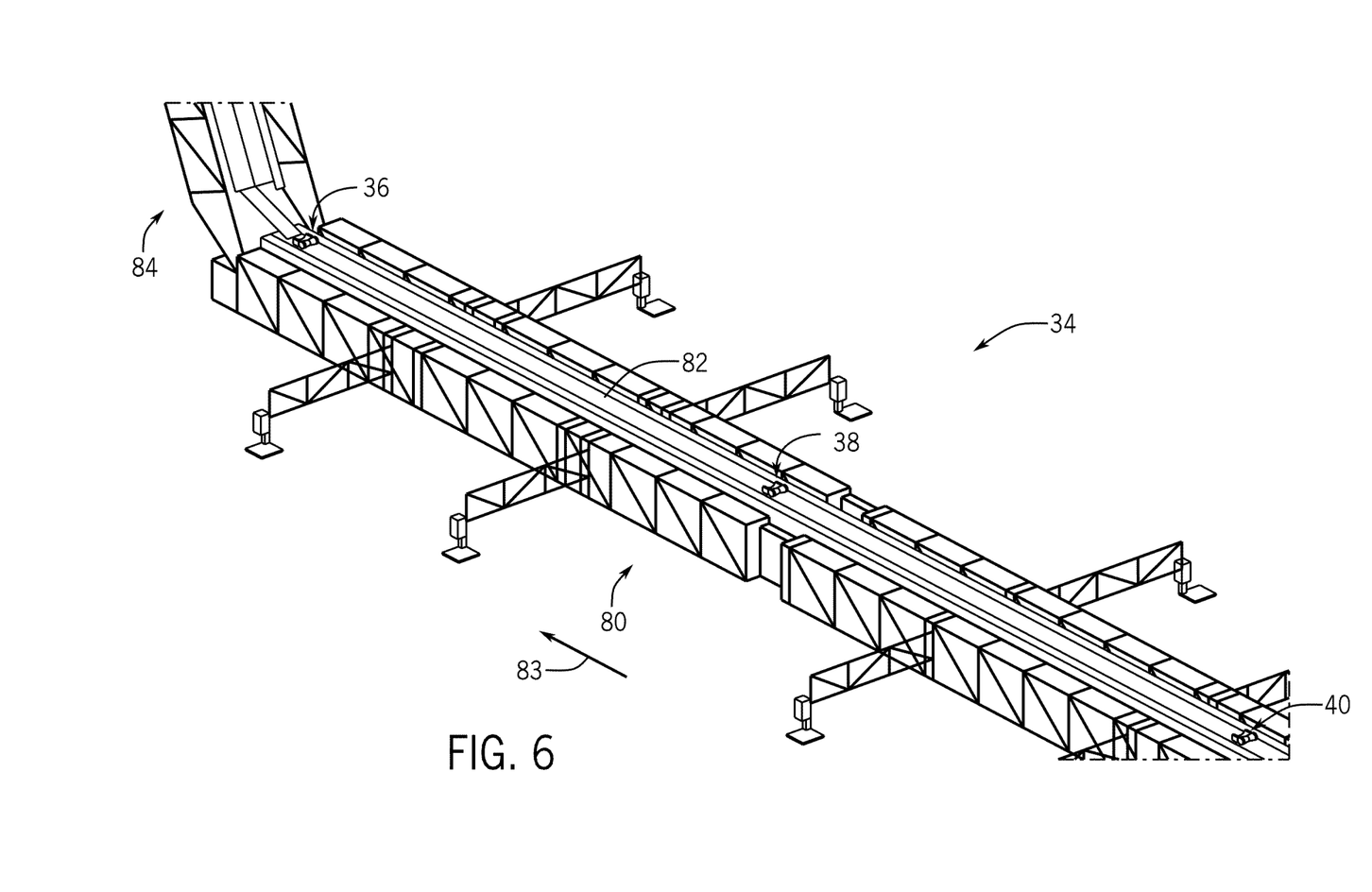
FIG. 6 is a perspective view of a catwalk machine of the tubular management system of FIG. 1, in accordance with an embodiment of the present disclosure.

FIG. 6 is a perspective view of an embodiment of the catwalk machine 34 of the tubular management system 10 of FIG. 1. In general, the catwalk machine 34 is configured to receive tubular components (including stands) from the assembly station 18 of FIG. 1, the storage bin 32 of FIG. 1, or some other location to deliver the tubular components (including stands) toward the drill floor 78 illustrated in the drilling rig 70 of FIG. 5. Additionally, the catwalk machine 34 is configured to receive tubular components (including stands), for example from the drill floor 78, and deliver the tubular components (including stands) to the storage bin 32 of FIG. 1, the assembly station 18 of FIG. 1, or some other location.

In the illustrated embodiment, the catwalk machine 34 includes a horizontal segment 80 having a trough 82 configured to receive tubular components (e.g., drill pipe, drill collar, drill casing/liner, drill sub) therein. An orientation of the trough 82 may define an axial direction 83 (or longitudinal direction) along with the tubular components are received by the catwalk machine 34. As shown, the catwalk machine 34 includes the first sensor array 36 disposed at a first axial location in the trough 82 along the axial direction 83, the second sensor array 38 disposed at a second axial location in the trough 82 along the axial direction 83, and the third sensor array 40 disposed at a third axial location in the trough 82 along the axial direction 83. The sensor arrays 36, 38, 40, which may be interferometer sensor arrays as previously described, are configured to detect aspects of tubular components received by the trough 82 of the catwalk machine. A pusher of the catwalk machine 34 (e.g., a hydraulically operated pusher, a pneumatically operated pusher, an electrically operated pusher, a conveyer, a trolley, etc.) may move the tubular components through the trough 82 and toward an angled segment 84 configured to angle the tubular components toward a vertical orientation prior to delivery of the tubular components to the drill floor. As previously described, a controller (e.g., the controller 12 of FIG. 1) may receive data feedback from the sensor arrays 36, 38, 40 and determine dimensions of the tubular components based on the data feedback (and, in some embodiments, based on a velocity the tubular component is moved through the horizontal segment 80 of the catwalk machine 34). Processing featured by the controller 12 for determining the dimensions of the tubular components are described in detail below with reference to FIG. 7.

Figure 7:
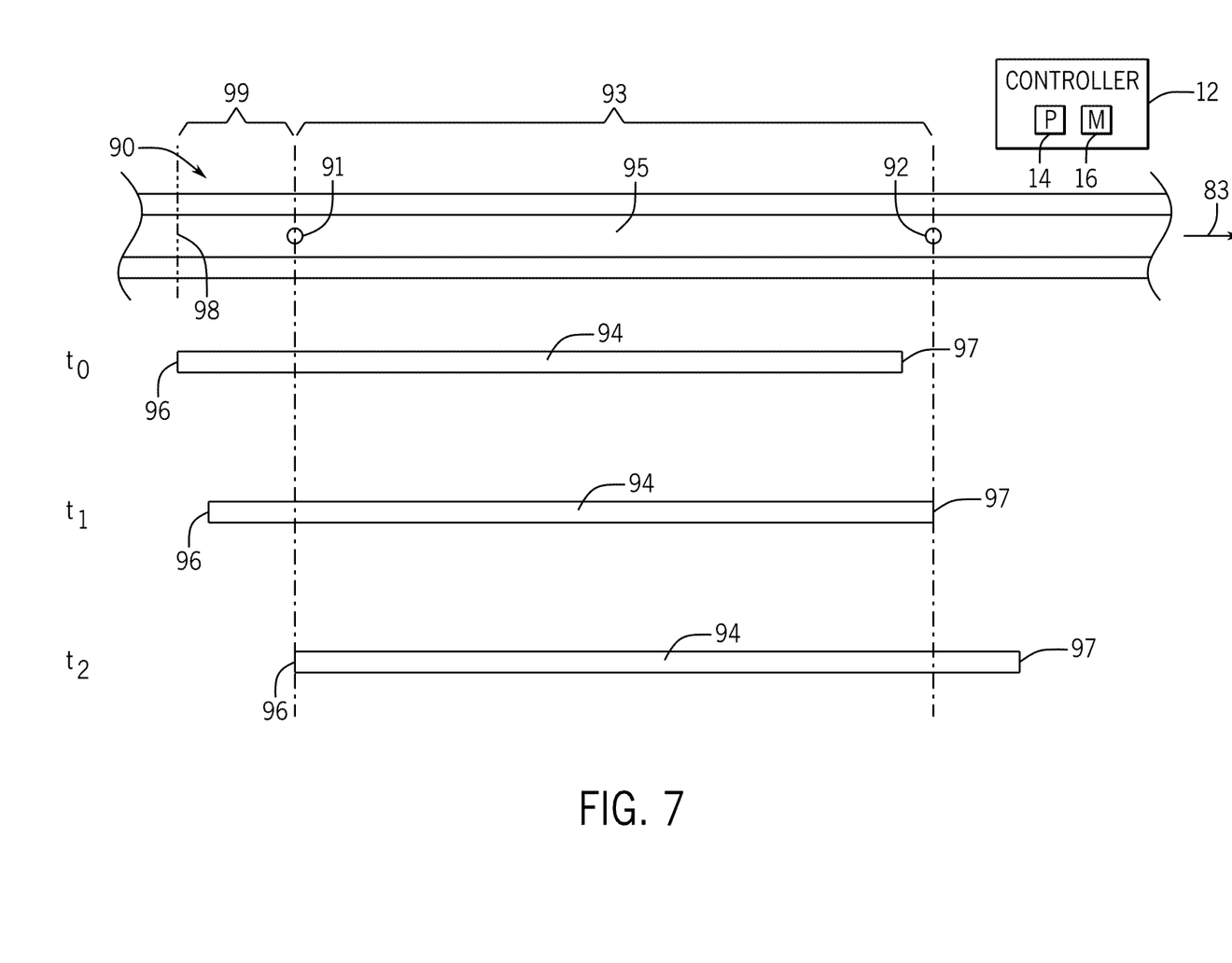
FIG. 7 is a schematic illustration of a portion of a horizontal tubular handler, such as an assembly station or a catwalk machine, of the tubular management system of FIG. 1, in accordance with an embodiment of the present disclosure.

FIG. 7 is a schematic illustration of an embodiment of a portion of a horizontal tubular handler 90, such as the assembly station 18 illustrated in detail in FIG. 2 or the catwalk machine 34 illustrated in detail in FIG. 6, for the tubular management system 10 of FIG. 1. In the illustrated embodiment, the horizontal tubular handler 90 includes a first sensor array 91 (e.g., first interferometer sensor array) and a second sensor array 92 (e.g., second interferometer sensor array). For example, the first sensor array 91 may correspond to the sensor array 20 of the assembly station 18 illustrated in FIG. 1, and the second sensor array 92 may correspond to the sensor array 22 of the assembly station 18 illustrated in FIG. 1. Alternatively, the first sensor array 91 may correspond to the sensor array 36 of the catwalk machine 34 illustrated in FIG. 1, and the second sensor array 92 may correspond to the sensor array 38 of the catwalk machine 34 of FIG. 1. The first sensor array 91 and the second sensor array 92 may be spaced from each other by a known distance 93. A tubular component 94 may be loaded into a trough 95 of the horizontal tubular handler 90 and oriented along the axial direction 83 defined by the trough 95. It should be noted that, in the illustrated embodiment, the tubular component 94 is illustrated in various positions over time. For simplicity, the tubular component 94 is not illustrated as being within the trough 95, but it should be understood that the illustrated positions of the tubular component 94 over time are intended to represent positions of the tubular component 94 within the trough 95.

At time $t_0$, the tubular component 94 is positioned within the trough 95 at a home position. For example, a first reference point 96 (e.g., a first end) of the tubular component 94 may be positioned within the trough 95 to align with a starting point 98 in the trough 95. The tubular component 94 may then be moved through the trough 95 and in the axial direction 83 at a known velocity until a second reference point 97 (e.g., a second end) of the tubular component 94 is detected by the second sensor array 92 at time $t_1$. The controller 12 may receive data feedback from the second sensor array 92 in response to the second sensor array 92 detecting the second reference point 97. In some embodiments, the controller 12 may be configured to determine or infer a length between the first reference point 96 and the second reference point 97 based upon the known velocity of the tubular component 94 being moved through the trough 95 in the axial direction 83 and/or an amount of time between to and $t_1$. Indeed, the distance 93 between the first sensor array 91 and the second sensor array 92 is known, a distance 99 between the first sensor array 91 and the starting point 98 in the trough 95 is known, the velocity of the tubular component 94 being moved through the trough 95 is known, and the amount of time between to and $t_1$ is known. With this information, the controller 12 may be capable of determining or inferring a length dimension between the first reference point 96 and the second reference point 97 of the tubular component 94.

In some embodiments, the controller 12 may be configured to determine the length dimension between the first reference point 96 and the second reference point 97 based upon data feedback received from the first sensor array 91 and the second sensor array 92. For example, in one embodiment, the distance 99 between the starting point 98 in the trough 95 and the first sensor array 91 may not be known. As the tubular component 94 is moved from the position corresponding to time $t_1$ and into the position corresponding to $t_2$, the first sensor array 91 may detect the first reference point 96 of the tubular component 94. The controller 12 may receive data feedback from the first sensor array 91 in response to the first sensor array 91 detecting the first reference point 96. The controller 12 may know, then, the distance 93 between the first sensor array 91 and the second sensor array 92, the velocity at which the tubular component 94 is moved through the trough 95, and an amount of time between $t_1$ (i.e., when the second sensor array 92 detects the second reference point 97 of the tubular component 94) and $t_2$ (i.e., when the first sensor array 91 detects the first reference point 96 of the tubular component 94. Based on this information, the controller 12 may be configured to infer or determine a length dimension between the first reference point 96 and the second reference point 97. Of course, as previously described, the controller 12 would also know an amount of time between to and $t_1$, which may or may not be used to infer or determine the length dimension between the first reference point 96 and the second reference point 97 of the tubular component.

It should be noted that each diameter dimension of the tubular component 94 may be determined by the controller 12 based on data feedback from individual sensor arrays. For example, data feedback from the second sensor array 92 may be used by the controller 12 to determine a diameter dimension of the tubular component 94 proximate the second reference point 97, and data feedback from the first sensor array 91 may be used by the controller 12 to determine another diameter dimension of the tubular component 94 proximate the first reference point 96. Further, as previously described, certain length dimensions could be determined based on data feedback from an individual sensor array. However, by including two or more sensor arrays (e.g., the first sensor array 91 and the second sensor array 92), a total length of the horizontal tubular handler 90 (e.g., horizontal segment of assembly station or catwalk machine) may be reduced compared to embodiments that employ only one sensor array. Indeed, with only one sensor array, if diameter dimensions on opposing sides of the tubular component 94 are to be determined, the tubular component 94 would need to be moved through the trough 95 (e.g., over the single sensor array) from end-to-end. Further, if the single sensor array were to detect reference points on opposing ends of the tubular component 94, the tubular component 94 would need to be moved through the trough 95 (e.g., over the single sensor array) from end-to-end. By including two or more sensor arrays (e.g., the first sensor array 91 and the second sensor array 92), an amount of movement of the tubular component 94 in the axial direction 83 needed to determine various dimensions of the tubular component 94 is reduced, thereby reducing a length of the horizontal tubular handler 90.

Further still, it should be noted that the reference points 96, 97 of the tubular component 94 may not correspond to ends of the tubular component 94. For example, a number of length dimensions and/or width dimensions corresponding to various segments (e.g., tube section, box, pin, tool joint, threads, coupler, etc.) of the tubular component (e.g., drill pipe, drill collar, drill casing/liner, drill sub) may be determined by the controller 12 based on data feedback from the sensor arrays 91, 92 and, in some embodiments, additional sensor arrays. Various length and diameter dimensions of various types of tubular components determinable by the controller 12 are described in detail below with reference to FIGS. 8-11.

Figure 8:
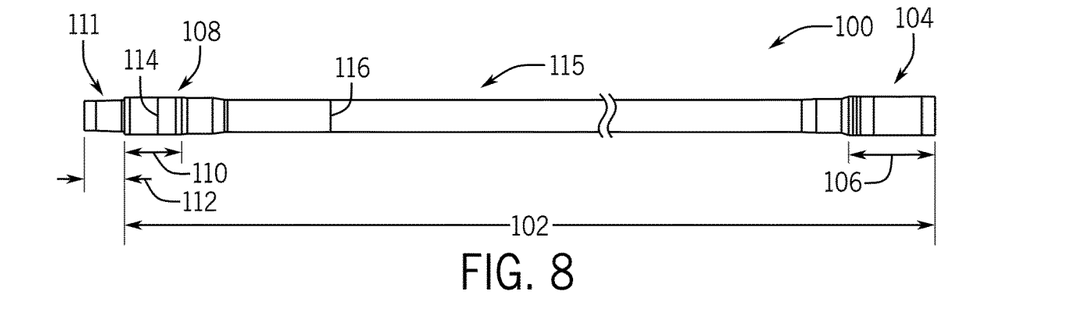
FIG. 8 is a side view of a drill pipe and corresponding dimensions determinable by the tubular management system of FIG. 1, in accordance with an embodiment of the present disclosure.

FIG. 8 is a side view of an embodiment of a drill pipe 100 and corresponding dimensions determinable by the tubular management system 10 of FIG. 1. In the illustrated embodiment, the drill pipe 100 includes a box 104 having a box length 106, a pin 108 having a pin length 110, and threads 111 having a thread length 112. Each of the lengths 102, 106, 110, 112 are determinable by the tubular management system 10 of FIG. 1. Further, the drill pipe 100 includes a tool joint diameter 114 (e.g., at the tool joint or pin 108) and a tube section diameter 116. The tube section diameter 116 corresponds to a tube section 115 of the drill pipe 100, where the tube section 115 is defined as the longest portion of the drill pipe 100 having a substantially constant diameter. Each of the diameters 114, 116 of the drill pipe 100 is determinable by the tubular management system 10 of FIG. 1. Further, a taper of the toil joint (or pin 108), the threads 111, or any other taper associated with the drill pipe 100 may be determinable by the tubular management system 10 of FIG. 1.

Figure 9:
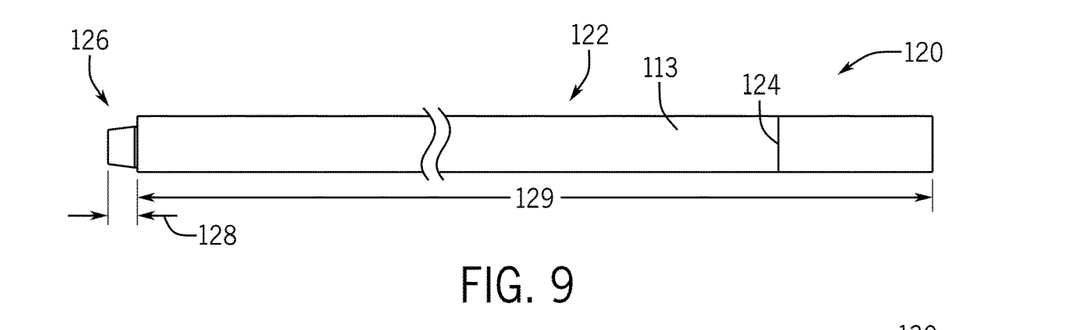
FIG. 9 is a side view of a drill collar and corresponding dimensions determinable by the tubular management system of FIG. 1, in accordance with an embodiment of the present disclosure.

FIG. 9 is a side view of an embodiment of a drill collar 120 and corresponding dimensions determinable by the tubular management system 10 of FIG. 1. In the illustrated embodiment, the drill collar 120 includes a collar tube section 122 (e.g., defined as the longest portion of the drill collar 120 having a substantially constant diameter). A collar tube section diameter 124 of the collar tube section 113 is determinable by the tubular management system 10 of FIG. 1. Further, the drill collar 120 includes a threaded section 126 having a thread length 128. The drill collar 120 also includes a shoulder-to-shoulder length 129. Each of the lengths 128, 129 are determinable by the tubular management system 10 of FIG. 1.

Figure 10:
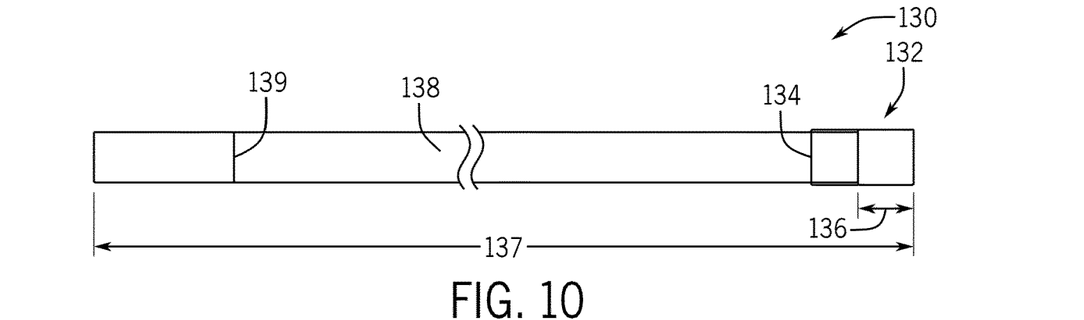
FIG. 10 is a side view of a drill casing and corresponding dimensions determinable by the tubular management system of FIG. 1, in accordance with an embodiment of the present disclosure.

FIG. 10 is a side view of an embodiment of a drill casing/liner 130 and corresponding dimensions determinable by the tubular management system 10 of FIG. 1. In the illustrated embodiment, the drill casing/liner 130 includes a coupling box 132 having a coupling diameter 134 and a coupling length 136. The coupling diameter 134 and the coupling length 136 are determinable by the tubular management system 10 of FIG. 1. The drill casing/liner 130 also includes a shoulder-to-shoulder length 137 (which includes the coupling box 132) determinable by the tubular management system 10 of FIG. 1. The drill casing/liner 130 also includes a casing tube section 138 (e.g., defined as the longest portion of the drill casing/liner 130 having a substantially constant diameter) with a casing tube section diameter 139 determinable by the tubular management system 10 of FIG. 1.

Figure 11:
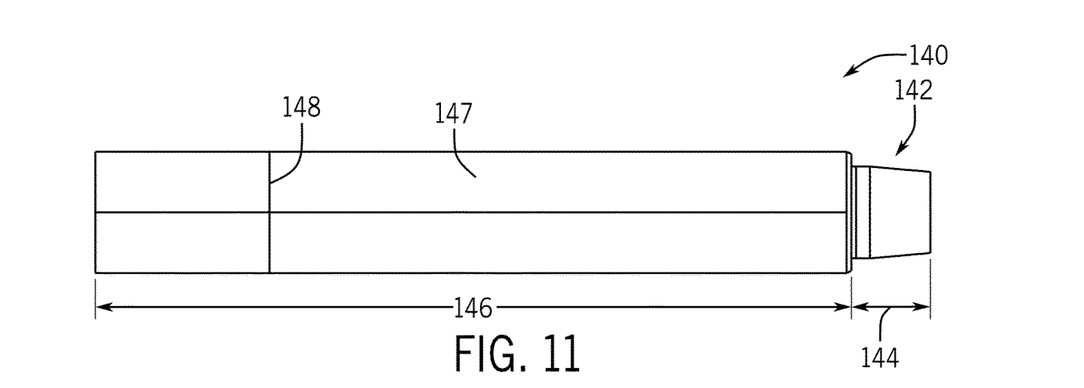
FIG. 11 is a side view of a drill sub and corresponding dimensions determinable by the tubular management system of FIG. 1, in accordance with an embodiment of the present disclosure.

FIG. 11 is a side view of an embodiment of a drill sub 140 and corresponding dimensions determinable by the tubular management system 10 of FIG. 1. The drill sub 140 includes a threaded section 142 having a thread length 144 determinable by the tubular management system 10 of FIG. 1. The drill sub 140 also includes a shoulder-to-shoulder length 146 determinable by the tubular management system 10 of FIG. 1. The drill sub 140 also includes a drill sub tube section 147 (e.g., defined as the longest portion of the drill sub 140 having a substantially constant diameter) with a drill sub tube section diameter 148 determinable by the tubular management system 10 of FIG. 1.

FIGS. 8-11 provide various examples of individual tubular components with dimensions determinable by the controller 12 of FIG. 1. However, it should be understood that stands (e.g., combinations of individual components) may also include various dimensions determinable by the controller 12 of FIG. 1. For example, length and diameter dimensions of the stand may be detected by various sensor arrays and/or determinable by the controller 12 of FIG. 1 based on data feedback received from the various sensor arrays. "Tubular component" as used herein should be understood to encompass both individual tubes (e.g., pipes, collars, casing/liners, subs) and stands.

Figure 12:
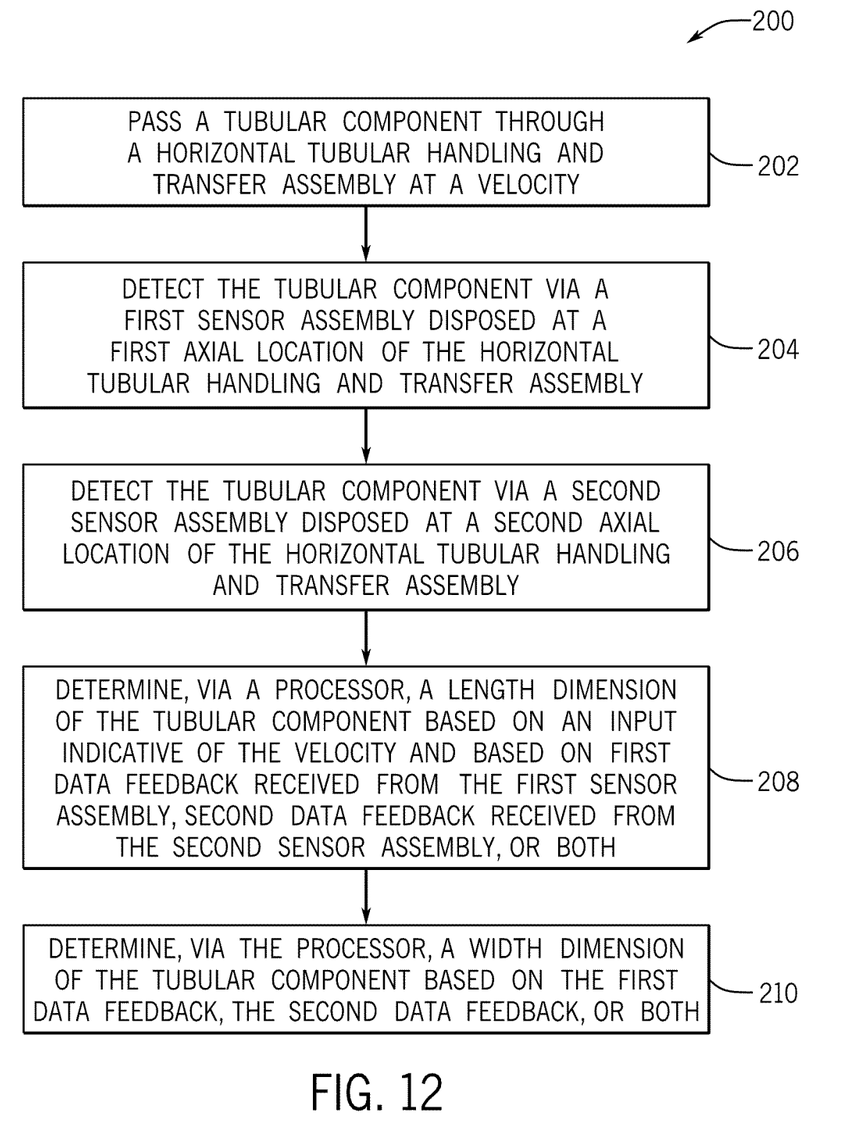
FIG. 12 is a flow diagram illustrating a method of operating the tubular management system of FIG. 1, in accordance with an embodiment of the present disclosure.

FIG. 12 is a flow diagram illustrating an embodiment of a method 200 of operating the tubular management system 10 of FIG. 1. In the illustrated embodiment, the method 200 includes passing (block 202) a tubular component through a horizontal tubular handling and transfer assembly at a velocity. For example, as previously described, the tubular component, such as a drill pipe, a drill collar, a drill casing/liner, or a drill sub, may be passed through an assembly station of the horizontal tubular handling and transfer assembly, a catwalk machine of the horizontal tubular handling and transfer assembly, or both. The tubular component may be passed through the component of the horizontal tubular handling and transfer assembly at a known velocity.

The method 200 also includes detecting (block 204) the tubular component via a first sensor array disposed at a first axial position of the horizontal tubular handling and transfer assembly, and detecting (block 206) the tubular component via a second sensor array disposed at a second axial position of the horizontal tubular handling and transfer assembly. As previously described, the first sensor array and the second sensor array may include interferometer sensor arrays, although other types of sensors are also possible.

The method 200 also includes determining (block 208), via a processor, a length dimension of the tubular component based on an input indicative of the above-described velocity (e.g., at block 202) and based on first data feedback received from the first sensor array, second data feedback received from the second sensor array, or both. As previously described, the tubular component may include any one of a drill pipe, a drill collar, a drill casing/liner, or a drill sub. Further, while the method 200 includes determining at least one length dimension of the tubular component, the processor may determine any number of length dimensions of the tubular component, including a shoulder-to-shoulder length, a box length, a pin length, a thread length, a coupling length, or the like.

The method 200 also includes determining (block 210), via the processor, a diameter dimension of the tubular component based on the first data feedback, the second data feedback or both. While the method 200 includes determining at least one width dimension of the tubular component, the processor may determine any number of width dimensions of the tubular component, including a tube section diameter (e.g., drill pipe tube section diameter, drill collar tube section diameter, drill casing/liner tube section diameter, or drill sub tube section diameter), a tool joint diameter, or the like.

The above-described features associated with FIGS. 1-12 may be implemented to improve accuracy and precision of measuring tubular component dimensions, which may lead to improved strand or drill string construction, improved strand or drill string deconstruction, reduced costs of the drilling operation, and other technical benefits relative to conventional embodiments.

It should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range. The statements made herein merely provide information related to the present disclosure and may not constitute prior art, and may describe some embodiments illustrating the invention.

This description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

If used herein, the term "substantially" is intended for construction as meaning "more so than not."

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

Although the disclosed embodiments are described in detail in the present disclosure, it should be understood that various changes, substitutions and alterations can be made to the embodiments without departing from their spirit and scope.

INDUSTRIAL APPLICABILITY

Tubular management systems configured to measure length and diameter dimensions of tubular components have industrial applicability including, but not limited to, tracking tubular dimensions for facilitating construction of a drill string and/or deconstructing a drill string.

What is claimed is:

1. A drilling system comprising:
   a horizontal tubular handling and transfer assembly configured to receive a tubular component and comprising an assembly station and a catwalk machine;
   a first sensor array disposed at a first axial location on the assembly station of the horizontal tubular handling and transfer assembly;
   a second sensor array disposed at a second axial location on the assembly station of the horizontal tubular handling and transfer assembly;
   a third sensor array disposed at a third axial location on the catwalk machine;
   a fourth sensor array disposed at a fourth axial location on the catwalk machine; and
   processing circuitry configured to:
      determine a length dimension of the tubular component based on first data feedback from the first sensor array, second data feedback from the second sensor array, or both;
      determine a diameter dimension of the tubular component based on the first data feedback, the second data feedback, or both;
      verify the length dimension of the tubular component based on third data feedback from the third sensor array, fourth data feedback from the fourth sensor array, or both; and
      verify the diameter dimension of the tubular component based on the third data feedback, the fourth data feedback, or both.

2. The drilling system of claim 1, wherein the processing circuitry is further configured to determine the length dimension based on a velocity at which the tubular component is moved through the horizontal tubular handling and transfer assembly.

3. The drilling system of claim 1, wherein the length dimension comprises a shoulder-to-shoulder length of the tubular component, a box length of the tubular component, a thread length of the tubular component, a sub length of the tubular component, a coupling length of the tubular component, or a pin length of the tubular component, and wherein the diameter dimension comprises a tube section diameter of the tubular component, a tool joint diameter of the tubular component, a collar diameter of the tubular component, a sub diameter of the tubular component, or a coupling diameter of the tubular component.

4. The drilling system of claim 1, wherein the processing circuitry is further configured to:
   determine an additional length dimension of the tubular component based on the first data feedback, the second data feedback, or both; and
   determine an additional diameter dimension of the tubular component based on the first data feedback, the second data feedback, or both.

5. The drilling system of claim 1, wherein the processing circuitry is further configured to store the length dimension of the tubular component and the diameter dimension of the tubular component to an e-tally database.

6. The drilling system of claim 5, further comprising:
   a top drive; and
   a controller of the top drive, wherein the controller is configured to receive e-tally data from the e-tally database indicative of the length dimension of the tubular component and the diameter dimension of the tubular component, and wherein the controller is configured to control the top drive based on the e-tally data.

7. The drilling system of claim 1, wherein the tubular component comprises a drill pipe, a drill collar, a drill casing, or a drill sub.

8. The drilling system of claim 1, further comprising:
   a fifth sensor array comprising a long sensing sensor array,
   wherein the assembly station comprises a bucking unit, and the fifth sensor array is disposed at the bucking unit.

9. A method of measuring a tubular component for a drilling operation, the method comprising:
   passing the tubular component through a horizontal tubular handling and transfer assembly comprising an assembly station and a catwalk machine;
   detecting the tubular component via a first sensor array disposed at a first axial position on the assembly station of the horizontal tubular handling and transfer assembly;
   detecting the tubular component via a second sensor array disposed at a second axial position on the assembly station of the horizontal tubular handling and transfer assembly;
   determining, via processing circuitry, a length dimension of the tubular component based on first data feedback received from the first sensor array, second data feedback received from the second sensor array, or both;
   determining, via the processing circuitry, a diameter dimension of the tubular component based on the first data feedback, the second data feedback, or both;
   verifying, via the processing circuitry, the length dimension of the tubular component based on third data feedback from a third sensor array, fourth data feedback from a fourth sensor array, or both, wherein the third sensor array and the fourth sensor array are disposed at a third axial location and a fourth axial location, respectively, on the catwalk machine; and verifying, via the processing circuitry, the diameter dimension of the tubular component based on the third data feedback, the fourth data feedback, or both.

10. The method of claim 9, further comprising:
determining, via the processing circuitry, an additional length dimension of the tubular component based on the first data feedback, the second data feedback, or both; and
determining, via the processing circuitry, an additional diameter dimension of the tubular component based on the first data feedback, the second data feedback, or both.

11. The method of claim 10, wherein:
the length dimension comprises a shoulder-to-shoulder length of the tubular component;
the additional length dimension comprises a box length, a pin length, or a thread length of the tubular component;
the diameter dimension comprises a tube section diameter of the tubular component; and
the additional diameter dimension comprises a tool joint diameter of the tubular component.

12. The method of claim 9, wherein the processing circuitry is further configured to determine the length dimension based on an input indicative of a velocity at which the tubular component is passed through the horizontal tubular handling and transfer assembly.

13. The method of claim 12, further comprising passing a drill pipe, a drill collar, a drill casing, or a drill sub corresponding to the tubular component through the horizontal tubular handling and transfer assembly at the velocity.

14. A drilling system comprising:
a horizontal tubular handling and transfer assembly configured to receive a tubular component and comprising an assembly station, wherein the assembly station comprises a bucking unit;
a first sensor array disposed at a first axial location on the assembly station of the horizontal tubular handling and transfer assembly, the first sensor array further being disposed on a first side of the assembly station;
a second sensor array disposed at a second axial location on the assembly station of the horizontal tubular handling and transfer assembly, the second sensor array further being disposed on the first side of the assembly station;
a third sensor array disposed on a second side of the assembly station;
a fourth sensor array disposed on the second side of the assembly station;
a fifth sensor array disposed at the bucking unit; and
processing circuitry configured to: determine a length dimension of the tubular component based on first data feedback from the first sensor array, second data feedback from the second sensor array, or both; and determine a diameter dimension of the tubular component based on the first data feedback, the second data feedback, or both.

15. The drilling system of claim 14, wherein the processing circuitry is further configured to determine the length dimension based on an input indicative of a velocity at which the tubular component is moved through the horizontal tubular handling and transfer assembly.

16. The drilling system of claim 14, wherein the length dimension comprises a shoulder-to-shoulder length of the tubular component, a box length of the tubular component, a thread length of the tubular component, a sub length of the tubular component, a coupling length of the tubular component, or a pin length of the tubular component, and wherein the diameter dimension comprises a tube section diameter of the tubular component, a tool joint diameter of the tubular component, a collar diameter of the tubular component, a sub diameter of the tubular component, or a coupling diameter of the tubular component.

17. The drilling system of claim 14, wherein the processing circuitry is further configured to:
determine an additional length dimension of the tubular component based on the first data feedback, the second data feedback, or both; and
determine an additional diameter dimension of the tubular component based on the first data feedback, the second data feedback, or both.

18. The drilling system of claim 14, wherein the processing circuitry is further configured to store the length dimension of the tubular component and the diameter dimension of the tubular component to an e-tally database.

19. The drilling system of claim 18, further comprising:
a top drive; and
a controller of the top drive, wherein the controller is configured to receive e-tally data from the e-tally database indicative of the length dimension of the tubular component and the diameter dimension of the tubular component, and wherein the controller is configured to control the top drive based on the e-tally data.

20. The drilling system of claim 14, wherein the tubular component comprises a drill pipe, a drill collar, a drill casing, or a drill sub.

* * * * *